Patented Apr. 30, 1946

2,399,607

UNITED STATES PATENT OFFICE 2,399,607

PROCESS OF MAKING VANILLIN

Richard Servis, Brooklyn, N. Y., assignor to Marathon Corporation, a corporation of Wisconsin No Drawing. Application August 6, 1943, Serial No. 497,689

12 Claims. (Cl. 260—600)

This invention relates to a process of making vanillin and isolating vanillin in the form of alkali vanillate from alkaline solutions. More particularly the invention relates to the recovery, concentration and purification of alkali vanillate, such as sodium or potassium vanillate, from an alkaline aqueous solution, especially when the solution contains large amounts of organic matter having solubilities different from alkali vanillate.

United States Patent No. 2,104,701, January 4, 1938, issued to Sandborn discloses a process of making vanillin by heat-treating an alkaline aqueous solution of lignin substance, preferably in the form of lignin sulphonic acid compounds, to convert lignin into a soluble vanillin compound, such as sodium vanillate, separating such vanillin compound from the alkaline aqueous solution by counter-current extraction with a suitable water-immiscible solvent, such as normal butyl alcohol, and recovering the solvent for reuse and the vanillin constituent for further purification by any known means, such as by distilling the solvent as its water-binary to leave the vanillin compound in an alkaline aqueous solution for further refining.

As a new and commercially useful improvement of such distillation procedure, I have discovered that the non-aqueous solvent, for example, butyl alcohol, can be recovered in practically vanillin-free condition suitable for reuse in the process without distillation or further purification and the vanillin compound can be obtained in aqueous solution favorable for further purification by a counter-current elution or extraction of the vanillin-containing organic solvent with a controlled amount of water, preferably containing a small amount of caustic soda. My method has the advantage of economizing in the use of steam and also avoids the loss of vanillin by heating that occurs in straight distillation of the butyl alcohol extract.

The following procedures and conditions for commercial operation of my improved process will serve to illustrate the invention, but I do not intend to limit its scope to such specified conditions except as defined in the appended claims.

In accordance with the method disclosed in Patent No. 2,104,701 an alkaline aqueous liquor containing vanillin is obtained by cooking lignin sulphonic compounds under pressure with water and caustic alkali, such as sodium hydroxide. This liquor (hereinafter designated as "vanillin-containing liquor") may contain around 400 grams per liter (g. p. l.) of total solids. When the lignin-containing substances are pressure cooked with sodium hydroxide the resulting liquor contains sodium vanillate, free caustic soda (NaOH) and various sodium salts, both organic and inorganic, in amounts equivalent to about 78 g. p. l. of $Na_2O$, considerable amounts of calcium compounds, both soluble and insoluble, and very large amounts of organic matter mainly in the form of soluble lignin sulphonate salts. This vanillin-containing liquor is extracted by counter-current flow with approximately 2,000 gallons of butyl alcohol to 1,000 gallons of the vanillin-containing liquor at about 73° C. The vanillin which may amount to around 7.5 g. p. l., exists in the manillin-containing solution as a sodium vanillate and the counter-current extraction transfers this vanillin compound as such from the strongly alkaline aqueous solution of high $Na_2O$ and organic matter concentrations into the butyl alcohol, (hereinafter referred to as "butyl alcohol extract").

The butyl alcohol extract thus obtained analyzes approximately 17 g. p. l. of total solids made up roughly of 1.8 g. p. l. of $Na_2O$, 4.0 g. p. l. of vanillin and the balance largely organic matter. In my improved process this butyl alcohol extract containing sodium vanillate is eluted by counter-current flow with approximately 1,000 gallons of water to which around 2.5 g. p. l. of NaOH has been added for 4,000 gallons of the butyl alcohol extract at around 70° C. I have found that the presence or addition of a controlled small amount of NaOH or its equivalent to the elution water is necessary to facilitate the removal of the sodium vanillate from the butyl alcohol extract by preventing the formation of too stable emulsions in the elution extractors. The dilute caustic soda solution also tends to stabilize the sodium vanillate. The presence of at least 2.0 g. p. l. and not over 10 g. p. l. of NaOH in the extraction water is believed necessary for practical elution of the sodium vanillate, but the presence of too much caustic soda impairs the efficiency of the elution since NaOH tends to lower the solubility of sodium vanillate in water. KOH may be used in place of NaOH if desired. Readily ionizable alkali-metal salts, such for example as potassium or sodium chloride, sodium sulphate, or sodium carbonate may be used in place of NaOH in about the same amounts to prevent forming stable emulsions, but these salts are less desirable since they lower the solubility of the sodium vanillate in water to a greater extent than NaOH. Caustic soda also lowers the solubility of sodium vanillate in water but to a lesser degree than salts.

The spent butyl alcohol extract after the elution may analyze around 10 g. p. l. of total solids of which 0.5 g. p. l. is $Na_2O$, 0.4 g. p. l. is vanillin and the balance is largely organic matter. This spent butyl alcohol is reused in the process to extract more vanillin-containing liquor.

The vanillin-containing alkaline water as it exits from the elution extractors may analyze around 25 g. p. l. of total solids of which about 8.0 g. p. l. is $Na_2O$, 10.0 g. p. l. is vanillin and the balance is organic matter. The resulting aqueous solution contains substantially all the sodium vanillate content of the original butyl alcohol extract in an alkaline aqueous solution of lesser volume, lower content in organic matter impurities and higher concentration of vanillin compound. This solution may be processed by any suitable conversion and purification procedures to yield vanillin of high purity.

Having described my invention, what I claim is:

1. The process of removing sodium vanillate from its alkaline solution in butyl alcohol which comprises eluting said organic solvent with a weak aqueous solution containing 2 to 10 grams per liter of caustic alkali to yield an alkaline aqueous solution containing substantially all the said vanillin salt and practically vanillin-free butyl alcohol suitable for reuse.

2. The process of removing sodium vanillate from its alkaline solution in butyl alcohol which comprises eluting said organic solvent with a weak aqueous solution containing 2 to 10 grams per liter of a readily ionizable alkali-metal salt to yield an alkaline aqueous solution containing substantially all the said vanillin salt and practically vanillin-free butyl alcohol suitable for reuse.

3. The process of removing sodium vanillate from a solution of sodium vanillate in butyl alcohol which comprises eluting said solution with an aqueous solution containing 2 to 10 grams per liter of sodium chloride to yield an aqueous solution containing substantially all the sodium vanillate in said butyl alcohol solution.

4. The process of removing sodium vanillate from a solution of sodium vanillate in butyl alcohol which comprises eluting a volume of said solution with a weak aqueous solution containing 2 to 10 grams per liter of caustic soda and of less volume than said solution of butyl alcohol to yield an aqueous solution containing substantially all the sodium vanillate in said butyl alcohol solution.

5. The process of removing sodium vanillate from a solution of sodium vanillate in butyl alcohol which comprises eluting a volume of said solution with a weak aqueous solution containing 2 to 10 grams per liter of caustic soda and of about one-fourth the volume of said solution of butyl alcohol to yield an aqueous solution containing substantially all the sodium vanillate in said butyl alcohol solution.

6. In the process of making vanillin by making lignin-containing substances under pressure with water and caustic alkali to form an alkaline liquor containing a soluble alkali-metal salt of vanillin, soluble organic compounds and other impurities, the steps of extracting said vanillin salt from said alkaline liquor with butyl alcohol to produce an alkaline solution of said vanillin salt in butyl alcohol and eluting said butyl alcohol solution with a weak aqueous solution containing 2 to 10 grams per liter of caustic alkali to yield an alkaline aqueous solution containing substantially all of the said vanillin salt and a practically vanillin-free butyl alcohol for reuse.

7. In the process of making vanillin by making lignin-containing substances under pressure with water and caustic soda to form an alkaline liquor containing a sodium vanillate, soluble organic compounds and other impurities, the steps of extracting said vanillin salt from said alkaline liquor with butyl alcohol to produce an alkaline solution of said vanillin salt in butyl alcohol and eluting said butyl alcohol solution with a weak aqueous solution containing 2 to 10 grams per liter of caustic alkali to yield an alkaline aqueous solution containing substantially all of the said vanillin salt and a practically vanillin-free butyl alcohol for reuse.

8. In the process of making vanillin by cooking lignin-containing substances under pressure with water and sodium hydroxide to form an alkaline liquor containing sodium vanillate, soluble organic compounds and other impurities, the steps of extracting the sodium vanillate from said liquor with butyl alcohol to produce a solution of sodium vanillate in butyl alcohol, eluting said solution with a weak aqueous solution containing at least 2 and not more than 10 grams per liter of caustic soda, to yield an aqueous solution containing substantially all the sodium vanillate in said butyl alcohol solution.

9. In the process of making vanillin by cooking lignin-containing substances under pressure with water and sodium hydroxide to form an alkaline liquor containing sodium vanillate soluble organic compounds and other impurities, the steps of extracting the sodium vanillate from said liquor with butyl alcohol to produce a solution of sodium vanillate in butyl alcohol, eluting said solution with a weak aqueous solution containing 2 to 10 grams per liter of caustic soda and of less volume than said solution of butyl alcohol to yield an aqueous solution containing substantially all the sodium vanillate in said butyl alcohol solution.

10. In the process of making vanillin by cooking lignin-containing substances under pressure with water and sodium hydroxide to form an alkaline liquor containing sodium vanillate, soluble organic compounds and other impurities, the steps of extracting the sodium vanillate from said liquor with butyl alcohol to produce a solution of sodium vanillate in butyl alcohol, eluting said solution containing 2 to 10 grams per liter with a weak aqueous solution of caustic soda to yield an aqueous solution containing substantially all the sodium vanillate in said butyl alcohol solution, and recovering vanillin from said aqueous solution.

11. In the process of making vanillin by cooking lignin-containing substances under pressure with water and sodium hydroxide to form an alkaline liquor containing sodium vanillate, soluble organic compounds and other impurities, the steps of extracting the sodium vanillate from said liquor with butyl alcohol to produce a solution of sodium vanillate in butyl alcohol, eluting said solution with a weak aqueous solution containing 2 to 10 grams per liter of caustic soda to yield an aqueous solution containing substantially all the sodium vanillate in said butyl alcohol solution, recovering sodium vanillate from said aqueous solution and purifying the vanillin.

12. In the process of making vanillin by cooking lignin-containing substances under pressure with water and sodium hydroxide to form an alkaline liquor containing sodium vanillate, soluble organic compounds and other impurities, the steps of extracting the sodium vanillate from said liquor with butyl alcohol to produce a solution of sodium vanillate in butyl alcohol, eluting said solution with a weak aqueous solution containing 2 to 10 grams per liter of caustic soda to yield an aqueous solution containing substantially all the sodium vanillate present in the said butyl alcohol solution and practically vanillin-free butyl alcohol, and reusing said butyl alcohol for extracting sodium vanillate from freshly cooked liquor.

RICHARD SERVIS.

Certificate of Correction

Patent No. 2,399,607. April 30, 1946.

RICHARD SERVIS

It is hereby certified that error appears in the printed specification of the above numbered patent requiring correction as follows: Page 2, second column, line 41, claim 10, strike out the words "containing 2 to 10 grams per liter" and insert the same after "solution" in line 42, same claim; and that the said Letters Patent should be read with this correction therein that the same may conform to the record of the case in the Patent Office.

Signed and sealed this 30th day of July, A. D. 1946.

[SEAL]

LESLIE FRAZER,
*First Assistant Commissioner of Patents.*